May 29, 1973  H. P. KIRCHNER ET AL  3,736,171

METHOD OF STRENGTHENING CERAMICS USING ION EXCHANGE

Filed June 19, 1969

INVENTORS
HENRY P. KIRCHNER
DENNIS R. PLATTS

BY *Wenderoth, Lind & Ponack*

ATTORNEYS

TABLE I

GLAZES FOR ALUMINA: COMPOSITION IN WEIGHT PER CENT AND LINEAR COEFFICIENT OF THERMAL EXPANSION

| Glaze | $Li_2O$ | $Na_2O$ | $K_2O$ | CaO | MgO | PbO | $B_2O_3$ | $Al_2O_3$ | $ZrO_2$ | $SiO_2$ | Thermal Exp. Coef. $\alpha$-cm/cm/°C 25°–300°C | 25°–500°C |
|---|---|---|---|---|---|---|---|---|---|---|---|---|
| HL | 11.8 | -- | -- | -- | -- | -- | -- | 40.5 | -- | 47.7 | -- | -- |
| S1 | -- | 19.5 | -- | -- | -- | -- | -- | 32.5 | -- | 48.0 | $103 \times 10^{-7}$ | -- |
| S3 | -- | 15.1 | -- | -- | -- | -- | 2.0 | 24.9 | -- | 58.0 | $70.8 \times 10^{-7}$ | $73.5 \times 10^{-7}$ |
| S4 | -- | 15.9 | -- | -- | -- | -- | -- | 26.2 | -- | 57.9 | $73.5 \times 10^{-7}$ | $82.5 \times 10^{-7}$ |

HENRY P. KIRCHNER and
DENNIS R. PLATTS,
*INVENTOR*

BY *Wendroth, Lind & Ponack*

*ATTORNEYS*

TABLE II

FLEXURAL STRENGTH OF 96% ALUMINA WITH ION EXCHANGE GLAZES

| EXAMPLE | GLAZE AND GLAZING SCHUDULE | ION EXCHANGE TREATMENT | NO. OF SPECIMENS | AVERAGE FLEXURAL STRENGTH* psi |
|---|---|---|---|---|
|  | As rec'd. controls, not glazed |  | 1 | 44,800 |
| 1 | HL, 1500°C, 1 h., annealed | none | 3 | 44,400 |
| 2 |  | NaNO$_3$, 400°C, 15 min. | 3 | 48,700 |
|  |  | NaNO$_3$, 400°C, 30 min. | 3 | 52,400 |
|  | Sl, 1500°C, 1 h., annealed | none | 5 | 42,300 |
| 3 |  | KNO$_3$, 400°C, 15 min. | 1 | 79,200 |
| 4 |  | KNO$_3$, 400°C, 30 min. | 2 | 75,100 |
| 5 |  | KNO$_3$, 400°C, 60 min. | 3 | 75,900 |
| 6 |  | KNO$_3$, 400°C, 120 min. | 3 | 71,500 |

* four-point loading on a two-inch span

TABLE III

TENSILE STRENGTH OF 96% ALUMINA WITH ION EXCHANGE GLAZE S3

| EXAMPLE NO. | ION EXCHANGE TREATMENT | NO. OF SPECIMENS | AVERAGE TENSILE STRENGTH - psi |
|---|---|---|---|
|  | None, control, not glazed | 5 | 34,500 |
|  | None, glazed control | 3 | 53,800 |
| 7 | 75% $KNO_3$, 25% $K_2SO_4$, 500°C, 1 h. | 4 | 59,300 |

TABLE IV

FLEXURAL STRENGTH OF 96% ALUMINA WITH ION EXCHANGE GLAZE S3, PROOF TESTED AT 70,000 psi GLAZING SCHEDULE: 1500°C, 1h., ANNEALED

| Example No. | Ion Exchange Treatment | Average Flexural Strength*-psi |
|---|---|---|
| 9 | none, control | 75,200 |
| 10 | 75% $KNO_3$, 25% $K_2SO_4$, 375°C, 1 h. | 73,000 |
| 11 | 75% $KNO_3$, 25% $K_2SO_4$, 375°C, 1 h. | 70,000 |
| 12 | 75% $KNO_3$, 25% $K_2SO_4$, 400°C, 1 h. | 71,900 |
| 13 | 75% $KNO_3$, 25% $K_2SO_4$, 450°C, 1 h. | 83,400 |
| 14 | 75% $KNO_3$, 25% $K_2SO_4$, 500°C, 1 h. | 79,500 |
|  | 75% $KNO_3$, 25% $K_2SO_4$, 550°C, 1 h. | 72,500 |

* four-point loading on a two-inch span

HENRY P. KIRCHNER &
DENNIS R. PLATTS,
INVENTORS

BY Wenderoth, Lind & Ponack
ATTORNEYS

TABLE V

EFFECT OF GLAZING SCHEDULE ON FLEXURAL STRENGTH OF ALUMINA RODS WITH ION EXCHANGE GLAZE S4

| EXAMPLE NO. | GLAZING SCHEDULE | ION EXCHANGE TREATMENT | NO. OF SPECIMENS | AVERAGE FLEXURAL STRENGTH - psi |
|---|---|---|---|---|
| 15 | 1500°C, 1 h., annealed | none, control | 3 | 72,100 |
| 16 | | KNO$_3$, 375°C, 17 min. | 3 | 64,400 |
|    | | KNO$_3$, 375°C, 100 min. | 3 | 68,100 |
| 17 | 1300°C, 1 h., annealed | none, control | 8 | 61,800 |
| 18 | | KNO$_3$, 375°C, 16 min. | 4 | 70,600 |
| 19 | | KNO$_3$, 375°C, 30 min. | 4 | 67,800 |
|    | | KNO$_3$, 375°C, 144 min. | 4 | 67,600 |
| 20 | 1250°C, annealed | none, control | 4 | 43,800 |
| 21 | | KNO$_3$, 375°C, 16 min. | 4 | 58,800 |
|    | | KNO$_3$, 375°C, 144 min. | 4 | 58,800 |
| 22 | 1250°C, 1 h., annealed | none, control | 9 | 55,300 |
|    | | KNO$_3$, 375°C, 30 min. | 9 | 64,100 |
| 23 | 1250°C, 1 h., quenched | none, control | 5 | 56,200 |
|    | | KNO$_3$, 375°C, 30 min. | 5 | 63,500 |
| 24 | 1250°C, 1 h., annealed | none, control | 3 | 58,700 |
|    | | KNO$_3$, 375°C, 30 min. | 3 | 61,300 |

United States Patent Office 3,736,171
Patented May 29, 1973

3,736,171
METHOD OF STRENGTHENING CERAMICS USING ION EXCHANGE
Henry P. Kirchner, 700 S. Sparks St., State College, Pa., and Dennis R. Platts, Boalsburg, Pa.; said Platts assignor to said Kirchner
Filed June 19, 1969, Ser. No. 834,729
Int. Cl. B44d 1/44; C04b 41/06
U.S. Cl. 117—62         9 Claims

ABSTRACT OF THE DISCLOSURE

A method of strengthening a body of alumina, having a glaze coating on at least one surface thereof, the glaze coating containing replaceable alkali metal ions taken from the group consisting of sodium and lithium and said glaze coating having approximately the same coefficient of expansion as that of the alumina of the body, said method comprising contacting the glaze coating with a material which is a source of replacement alkali ions taken from the group consisting of potassium and sodium, which replacement ions are larger than the replaceable ions in the glaze coating replaced and which will exchange with the replaceable ions in the glaze coating, and supplying heat to the contacted glaze coating and replacement ion source material at a temperature and for a time less than are necessary for relaxing the glaze for carrying out the ion exchange.

---

This application relates to a method of strengthening ceramic materials, especially alumina, and more particularly relates to a method of strengthening alumina by glazing it with a glaze which contains ions which can be exchanged with ions in a source of ions in contact with the glazed surface of the alumina.

Processes for forming a compressive surface layer in glass are known. The processes comprise stuffing the surface layer of the glass by exchanging for ions in the surace layer ions which are larger than the replaced ions. Usually larger ions from a fused salt bath are exchanged for smaller ions in the glass surface at temperatures below the strain point of the glass. The glass network does not relax, but instead it tends to expand to accommodate the larger ions, and since the surface is restrained by the underlying glass, this tendency to expand leads to compressive stresses in the surface of the glass. One example of such a process is found in U.S. Pat. No. 3,218,220 to Weber.

It has now been discovered that the process of ion exchange can be carried out with ceramic materials, especially alumina, and that this will lead to an improvement in the strength of the ceramic materials, particularly the flexural strength. The process generally comprises forming a glaze coating on the ceramic body to be strengthened, which glaze coating contains ions which are to be replaced, and thereafter contacting the body with said glaze coating with a material which is a source of replacement or exchange ions, for example a molten salt bath, and heating the body in order to carry out the ion exchange. It has been found that the ions from the ion source material will replace the ions in the coating, and when the ions in the ion source material are larger than the ions which they replace, the glaze coating will be stuffed, and will be under compression with respect to the underlying body.

Several conditions are important in carrying out the method for strengthening the ceramic bodies. It will be apparent from the above discussion that the replacement or stuffing ions must be larger than the ions replaced, because otherwise the glaze coating will not be placed under compression. Moreover, it is clear that the glaze coating must have approximately the same coefficient of expansion as the underlying ceramic body. It must also be strongly united to the underlying body. Otherwise, the glaze coating will simply break away from the underlying body when it is subject to heat or when it is placed under compressive stress during the ion exchange process.

Figure 1:
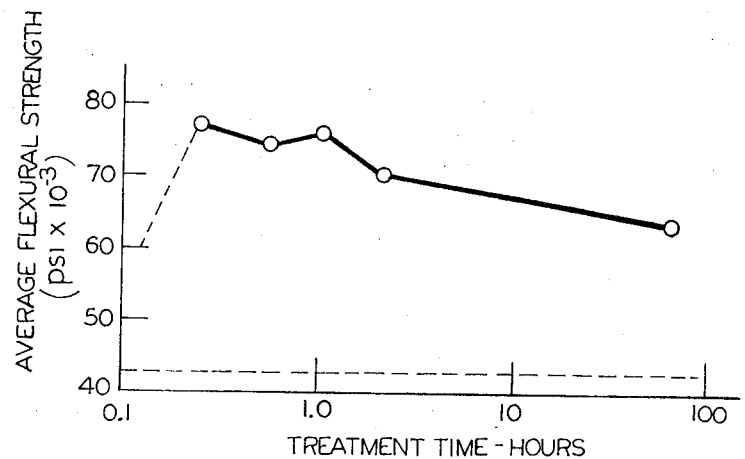
Figure 2:
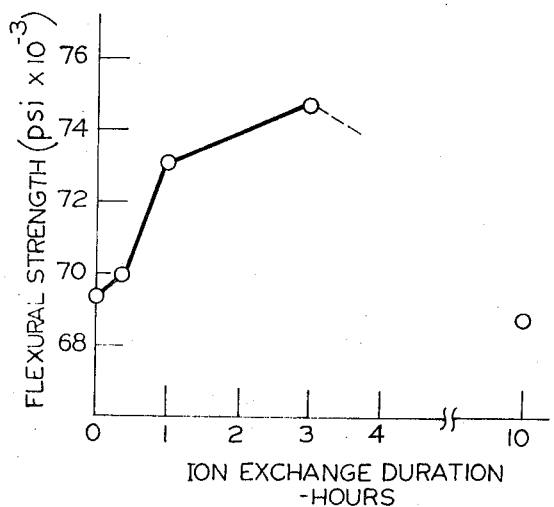

The invention will now be described in greater detail in connection with the accompanying drawings, in which:

FIGS. 1 and 2 are graphs showing the effect of the duration of the ion exchange treatment on the flexural strength of alumina.

The method of the invention will be described in detail with reference to alumina, and more specifically polycrystalline alumina which is 96% pure, and polycrystalline alumina which is 99.9% pure. The glazes which were used were alkali metal ion containing glazes. However, it should be understood that the method is not limited either to alumina or to the particular glazes described. By properly selecting the glazes for their properties and ion content, it should be possible to extend the method in order to strengthen other types of ceramic materials such as titania, spinel, porcelain, and the like.

In the following specific examples the glazes which were used as the glaze on the ceramic body were as set forth in Tables are on drawings. These glazes were selected in order to make possible the replacement of lithium ions with sodium ions, or the replacement of sodium ions with potassium ions. It should be pointed out that not all of these glazes fit the alumina body very well. For example, the S1 glaze is useful only if it is applied in a thin layer and if sufficient time is allowed for the glaze to reduce its thermal expansion coefficient by reaction with the body.

EXAMPLES 1 AND 2

Alumina rods of Alsimag #614 96% pure alumina, a product of American Lava Co., and which were about 2.5 in. long and 0.125 in. in diameter were prepared, and were glazed with the HL glaze to a thickness of .003 in. The glazed rods were fired at 1500° C. for 1 hour, and were then annealed by cooling in the furnace. The group of 3 rods of Example 1 were then immersed in an ion exchange bath consisting of molten NaNO₃ and subjected to an ion exchange treatment by being held in the bath at 400° C. for 15 min. The thus treated rods were cooled in air. The group of 3 rods of Example 2 was treated in the same way as those of Example 1, except that they were held for 30 min. in the ion exchange bath.

The rods were then tested for flexural strength on a two inch span with four point loading, and the strengths were as shown in Tables are on drawings.

EXAMPLES 3–6

Alumina rods as described in Examples 1 and 2 were prepared and glazed with the S1 glaze to a thickness of .003 in. The glazed rodsw ere fired at 1500° C. for 1 hour, and were then annealed by cooling in the furnace. The rods were then immersed in a molten bath of an ion exchange salt consisting of KNO₃ and the rod of Example 3 was held in the ion exchange bath at 400° C. for 15 min. The 2 rods of Example 4 were held at the same temperature for 30 min., the 3 rods of Example 5 were held at the same temperature for 60 min., and the 3 rods of Example 6 were held at the same temperature for 120 min.

The rods were then tested as in Examples 1 and 2, and the flexural strengths were as shown in Tables are on drawings. The effect of the duration of the ion exchange treatment is shown in FIG. 1.

As can be seen from Table II and FIG. 1, the replacement of the lithium ions with sodium ions in the high lithium HL glaze substantially increased the strength of the bodies, while the flexural strength of the alumina rods with the S1 high sodium ion glaze was substantially increased by replacing the sodium ions therein with potassium ions. The strength of the treated bodies appears to vary with the duration of the ion exchange treatment, reaching a maximum after a short treatment time and then declining.

EXAMPLE 7

Alumina rods as described in Examples 1 and 2 were prepared and glazed with the S3 glaze to a thickness of .003 in. The glazed rods were fired at 1500° C. for 1 hour, and were then annealed by cooling in the furnace. The rods of Example 7 were then immersed in a molten ion exchange material consisting of 75% $KNO_3$ and 25% $KS_2O_4$. The rods were held in the ion exchange material at 500° C. for 60 min.

The rods were then tested for tensile strength, and the strengths were as shown in Table III. The rods showed a definite improvement in tensile strength.

EXAMPLE 8

Alumina rods as described in Examples 1 and 2 were prepared and glazed with the S3 glaze to a thickness of .003 in. The glazed rods were fired at 1500° C. for 1 hour, and were then annealed by cooling in the furnace. The rods were then immersed in a molten ion exchange material consisting of 75% $KNO_3$ and 25% $K_2SO_4$ and held therein at 500° C. for about 15 min., 1 hour, 3 hours and 10 hours, respectively.

The rods were then tested for flexural strength as in Examples 1 and 2, and the strengths were as shown in FIG. 2.

As with the Examples 3–6, the results show that the flexural strengths increase for short or moderate treating times, but after a long schedule the strength declines to values near those of untreated glazed controls.

EXAMPLES 9–14

In order to determine the effect of the ion exchange treatment schedule, alumina rods as described in Examples 1 and 2 were prepared and glazed with S3 glaze to a thickness of .003 in. The rods were fired at 1500° C. for 1 hour, and annealed by cooling in the furnace. The rods were then immersed in a molten bath of an ion exchange material consisting of 75% $KNO_3$ and 25% $K_2SO_4$ for 1 hour at various temperatures. The rods of Examples 9 and 10 were immersed at 375° C., the rods of Example 11 at 400° C., the rods of Example 12 at 450° C., the rods of Example 13 at 500° C., and the rods of Example 14 at 550° C.

In an effort to obtain more indicative results, defective specimens were eliminated after the glazing step and prior to the ion exchange treatment by subjecting all rods to 70,000 p.s.i. bending stress.

After the ion exchange treatments, the rods were tested for flexural strength as in Examples 1 and 2, and the results are as shown in Table IV. It will be seen that there was a significant increase in strength at ion exchange treatment temperatures of 450°–500° C. The process of ion exchange is probably too slow at 400° C. and lower to improve the strength noticeably, and stress relaxation probably occurs at temperatures above 500° C.

EXAMPLES 15–23

In order to determine the effect of the glazing schedule on the strength of the rods, alumina rods were prepared as in Examples 1 and 2 and were glazed with glaze S4. The rods of Examples 15–16 were fired at 1500° C. for 1 hour and then annealed as described above. The rods of Examples 17–19 were fired at 1300° C. for 1 hour and annealed. The rods of Examples 20–22 were fired at 1250° C. for 1 hour and annealed, while the rods of Example 23 were fired at 1250° C. and quenched in ambient air.

All of the rods were immersed in a molten bath of an ion exchange material consisting of $KNO_3$ at a temperature of 375° C. for the various times listed in Table V.

The rods were tested for flexural strength as in Examples 1 and 2, and the results were as set forth in Table V.

EXAMPLE 24

Alumina rods the same as in Examples 15–23, but of Coors 99.9% alumina, were prepared and treated the same as the rods in Examples 23. The strength is shown in Table V.

It can be seen from these results that the ion exchange treatment at 375° C. for the rods glazed at 1500° C. is without strengthening effect. The strength of the controls is seen to increase with increasing glazing temperature so that even if the ion exchange treatment increases the relative strength of the specimens, the strength of the rods, which are simply glazed at 1500° C., is greater than the ion exchange treated rods treated at lower temperatures.

The treatment of the rods of both Alsimag #614 and the Coors alumina produces an increase in strength where the glazing is carried out at 1250° C., and a somewhat smaller strength increase is produced where the rods are glazed at 1300° C.

Electron microprobe analyses were carried out in an effort to explain the results of Examples 15–24. It was found that when the glazing temperature is high, the glazed surfaces become depleted in alkali, and ion exchange can take place to only a small degree; furthermore, there are indications that a crystalline phase is formed at the interface between the glaze and the alumina, and this may act as a trap for alkali ions, both the original and the exchanged. The interface reaction leads to high strength of the glazed rods, but is detrimental to ion exchange.

It can be seen from the foregoing that ion exchange stuffing of glazes on alumina is an effective means of improving the strength of glazed alumina. The success of the technique depends on the glaze maturing schedule as well as the glaze composition and the ion exchange treating schedule. Moreover, the method can be extended to other ceramic materials by choosing the proper glazes which will be compatible with the ceramic material and which lend themselves to having the ions thereof exchanged for other ions having a larger size.

What is claimed is:

1. A method of strengthening a body of alumina, having a glaze coating on at least one surface thereof, the glaze coating containing replaceable alkali metal ions taken from the group consisting of sodium and lithium and said glaze coating having approximately the same coefficient of expansion as that of the alumina of the body, said method comprising contacting the glaze coating with a material which is a source of replacement alkali ions taken from the group consisting of potassium and sodium, which replacement ions are larger than the replaceable ions in the glaze coating replaced and which will exchange with the replaceable ions in the glaze coating, and supplying heat to the contacted glaze coating and replacement ion source material at a temperature and for a time less than are necessary for relaxing the glaze for carrying out the ion exchange.

2. A method as claimed in claim 1 in which the step of contacting the glaze coating with the ion source material comprises immersing the glazed alumina body in a molten bath of the ion source material.

3. A method as claimed in claim 1 in which the glaze is a high lithium glaze including about 12% lithium oxide, and the ion source material is molten sodium nitrate.

4. A method as claimed in claim 3 in which the glaze has a composition consisting of about 11.8% by weight $Li_2O$, 40.5% by weight $Al_2O_3$ and 47.7% $SiO_2$, and the glazed alumina body is held in the molten sodium nitrate at 400° C. for 1 hour.

5. The strengthened body of alumina material produced by the method of claim 4.

6. A method as claimed in claim 3 in which the glaze has a composition consisting of about 14.5–16% by weight $Na_2O$, from about 48–58% by weight $SiO_2$ and from about 25–32.5% $Al_2O_3$, and the glazed alumina body is held in the molten potassium nitrate at temperatures of from 400–500° C. for periods of from 1 hr. to 15 min., respectively.

7. The strengthened body of alumina material produced by the method of claim 6.

8. A method as claimed in claim 1 in which the glaze is a high sodium glaze including from about 15% to about 20% $Na_2O$, and the ion source material is a molten potassium nitrate.

9. The strengthened body of alumina material produced by the method of claim 1.

References Cited
UNITED STATES PATENTS

| | | | |
|---|---|---|---|
| 3,619,420 | 11/1971 | Toussaint et al. | 117—62 |
| 2,017,318 | 10/1935 | McCoy | 117—62 |
| 3,218,220 | 11/1965 | Weber | 65—30 |
| 3,356,477 | 12/1967 | Chisholm et al. | 65—30 |
| 3,506,423 | 4/1970 | Morris | 65—30 |
| 3,477,834 | 11/1969 | Morris | 65—30 |
| 3,495,963 | 2/1970 | Buckley et al. | 65—30 |
| 3,524,737 | 8/1970 | Doyle et al. | 65—30 |
| 2,859,138 | 11/1958 | Blanchard | 117—169 R |
| 3,558,346 | 1/1971 | Plumley | 117—123 A |
| 3,529,946 | 9/1970 | Fisher et al. | 65—30 |
| 3,533,888 | 10/1970 | Eppler et al. | 65—30 |
| 3,553,063 | 1/1971 | Megles | 65—30 |
| 3,573,072 | 3/1971 | Duke | 65—30 |
| 3,573,075 | 3/1971 | Karstetter | 65—30 |
| 3,573,076 | 3/1971 | Rittler | 65—30 |

WILLIAM D. MARTIN, Primary Examiner

M. SOFOCLEOUS, Assistant Examiner

U.S. Cl. X.R.

117—123A, 169 R